Figure 1:
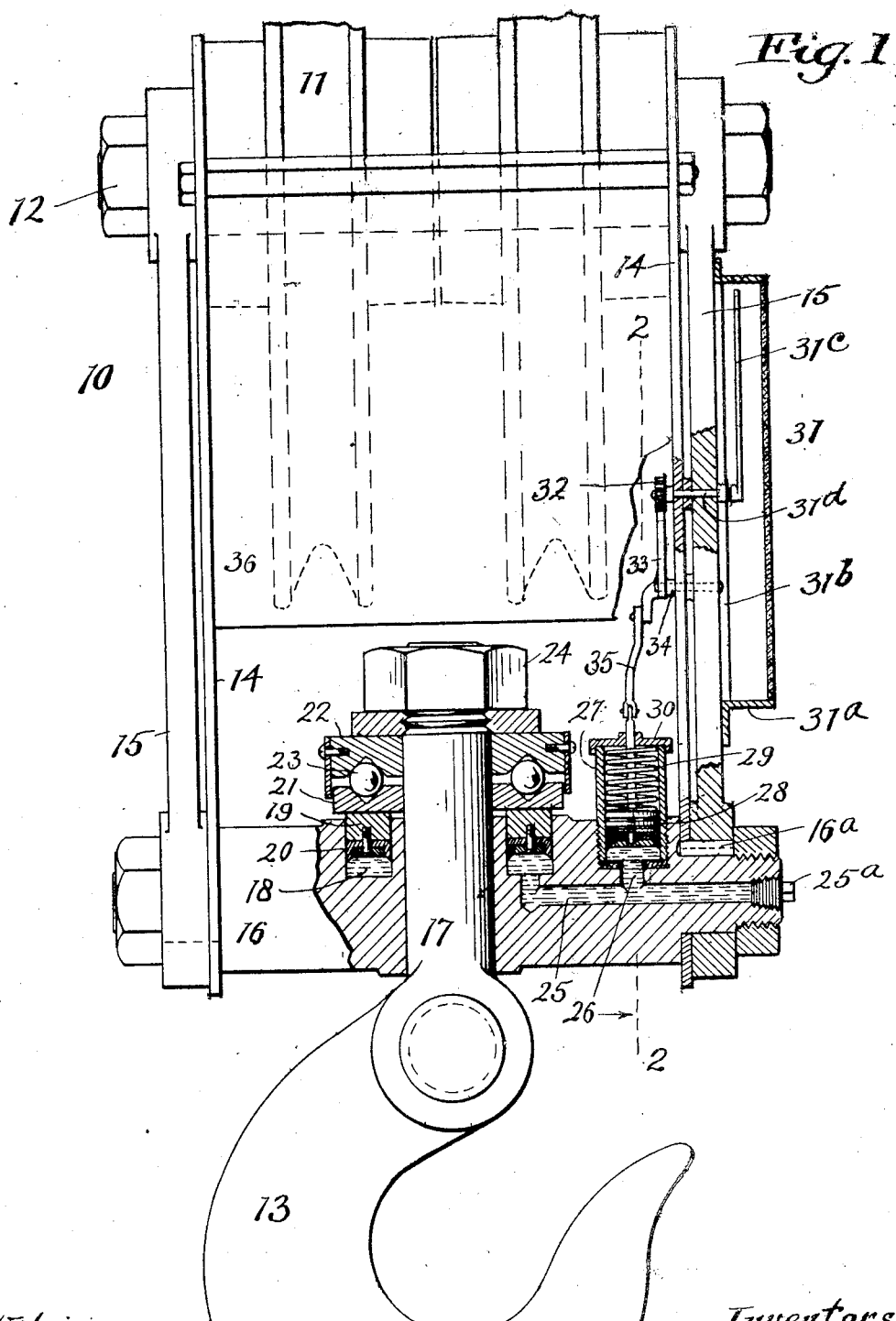

C. E. BEARD & W. G. STEPHAN.
HOIST BLOCK.
APPLICATION FILED MAY 22, 1911. RENEWED JUNE 29, 1915.

1,236,532.

Patented Aug. 14, 1917.
2 SHEETS—SHEET 1.

Witnesses.
E. B. Gilchrist.
H. R. Sullivan.

Inventors.
Clement E. Beard
Walter G. Stephan
by Thurston & Kwis atty

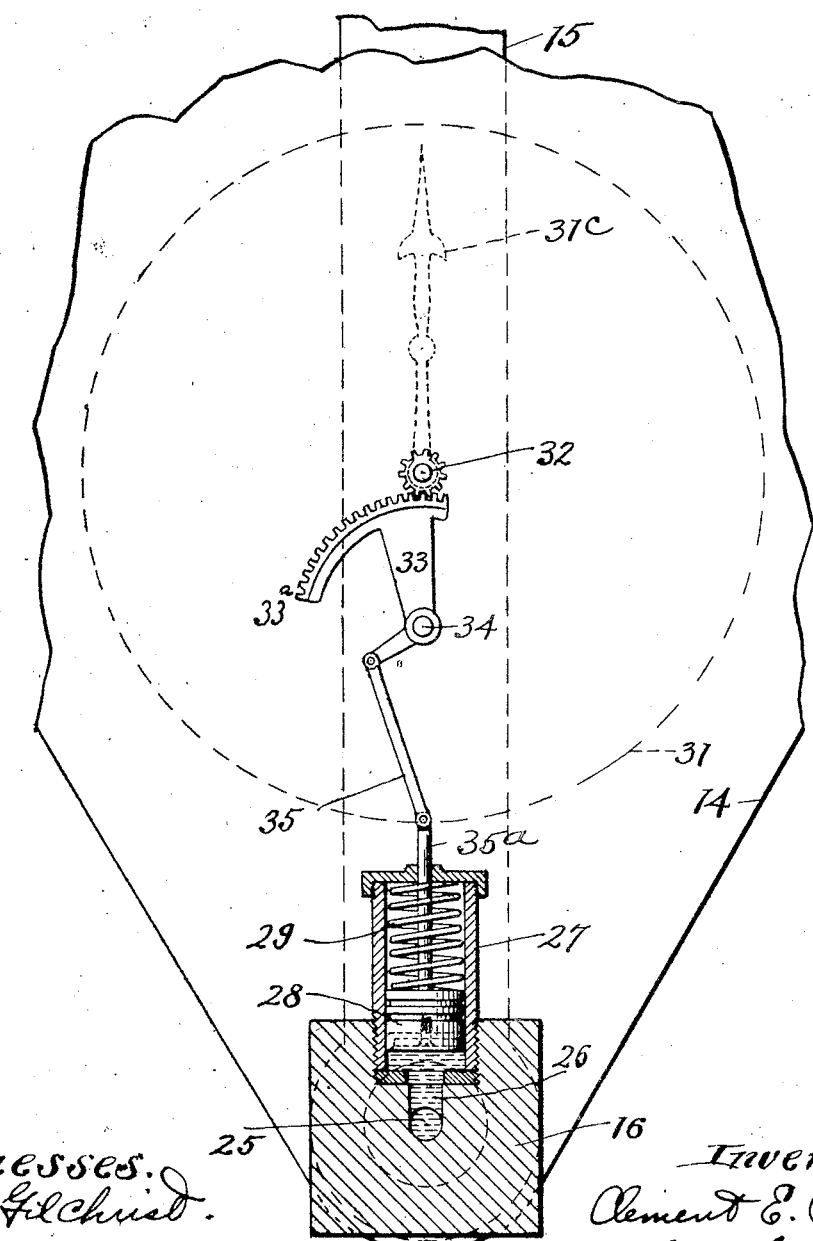

UNITED STATES PATENT OFFICE.

CLEMENT E. BEARD, OF COLUMBIANA, AND WALTER G. STEPHAN, OF CLEVELAND, OHIO.

HOIST-BLOCK.

1,236,532.  Specification of Letters Patent.  Patented Aug. 14, 1917.

Application filed May 22, 1911, Serial No. 628,720. Renewed June 29, 1915. Serial No. 37,119.

*To all whom it may concern:*

Be it known that we, CLEMENT E. BEARD and WALTER G. STEPHAN, citizens of the United States, and residents, respectively, of Columbiana, in the county of Columbiana and State of Ohio, and Cleveland, in the county of Cuyahoga and State of Ohio, have invented a certain new and useful Improvement in Hoist-Blocks, of which the following is a full, clear, and exact description.

This invention relates to improvements in hoist blocks and especially to means whereby the weight of the load carried at any time by the block can be indicated or measured, the present invention being a modification of and in certain aspects an improvement over the construction disclosed in the patent for hoist block, granted to W. G. Stephan, (one of the present joint inventors), No. 912,434, Feb. 16th, 1909.

In the patent to Stephan above mentioned, there is disclosed a hoist block having as a part thereof a weight indicating device which will at all times indicate the load supported on the hook of the block, this arrangement and construction having a marked advantage over the weighing devices employed prior to the Stephan invention, in the respect that the weighing device as it forms a permanent part of the block is always ready for use, and does not obstruct or interfere in any way with the hook, while on the other hand, the prior weighing devices were designed to be attached to the hook and were used only at intervals or when necessity demanded. As a matter of fact, the devices previously employed could not in most cases be kept on the hook of the block continually, in view of the space which they occupy and in view of the fact that the amount of head room occupied by the hoisting apparatus with the weighing device attached was often too great to permit of their use.

The object of the present invention is to provide a hoist block with a weight indicating or measuring means permanently associated with the block, which is always ready for use, and as in the Stephan construction, does away with the necessity for a separate weighing device which is at times attached to the hook of the block when a weight is to be indicated, and at other times is detached from the hook and not in position for use.

In the Stephan patent, the weight indicator is in the form of a fluid pressure gage, the fluid pressure which actuates the needle or other indicating device varying directly as the load on the hook varies, there being a fluid connection between the indicator and a well which receives a piston connected to the hook. The present invention aims also to provide an improved form of weight indicator operated by mechanical means, preferably consisting of a system of levers and gearing connected at one end to the needle or other movable part of the indicator and at the other end to a device which is controlled by the load on the hook, this device in the present embodiment of our invention being in the form of a fluid actuated piston which is in communication with a well receiving a piston which sustains the load hook.

Our invention may be briefly summarized as consisting of certain novel details of construction and combinations and arrangements of parts which will be described in the specification and set forth in the appended claims.

In the accompanying sheets of drawings, Figure 1 is an enlarged elevation with certain portions in section and with portions broken away, of a hoist block provided with a weight indicator arranged and constructed in accordance with our invention; Fig. 2 is a sectional view of part of the hoist block and indicator, the section being taken substantially along the line 2—2 of Fig. 1, looking in the direction indicated by the arrow.

In the drawings, 10 represents as a whole the hoist block including a pair of sheaves 11 adapted to receive the hoisting cable in the usual manner, the sheaves being mounted upon a stud 12. The block also includes a load hook 13 which is supported by a yoke including cheek plates 14, downwardly extending side bars or straps 15, the cheek plates and bars being supported from the stud 12, and a lower cross bar 16 which is supported in the lower ends of the cheek plates and side bars and is held against movement therein by some means such as keys 16ª, one of which is shown in Fig. 1.

In the patent to Stephan before mentioned, the load hook has an integral stem which passes upwardly through the bar which is trunnioned, but in the present case it is essential that the bar 16 be held against rocking movement. Accordingly, the hook 13 is pivotally connected to a stem 17 which passes loosely through a central perforation in the lower cross bar 16 so that it may readily turn in said bar. The bar 16 is provided concentrically with respect to the opening through which the stem 17 passes with an annular well 18 which is adapted to contain a suitable liquid and which receives an annular piston 19 provided on its lower face with flexible packing indicated at 20. This piston 19 sustains a centrally perforated bearing disk 21 provided on its upper face with an annular bearing groove, and arranged above the disk is a similar disk 22 having on its lower face a complementary bearing groove which, together with the groove on the lower disk, constitutes a raceway containing a series of anti-friction bearings 23 which permit the upper disk to turn readily with respect to the lower disk. One or more nuts 24 at the upper end of the stem 17 support the stem and the associated hook 13 in proper relation to the other parts and permit the load supported by the hook to be transmitted through the bearings and bearing disks before mentioned to the piston 19, which it will be understood occupies some position in the well, depending upon the load supported by the hook.

From the annular well 18 there extends axially of the bar 16 a passageway 25 which being in direct communication with the well is adapted also to be filled with the liquid. This passageway 25 preferably extends to the end of the bar and is closed at its outer end by a suitable plug 25$^a$. From the passageway 25, a second passageway 26 extends upwardly, the top of this passageway being relatively larger than the lower part which communicates with the lower axially extending passageway 25. Inserted in the upper enlarged part of the passageway 26 is a bushing 27 constituting a cylinder, which receives a second piston 28 adapted to be actuated by fluid pressure or movement caused by the movement of the annular piston 19 which sustains the load hook. The movement of the piston 28 is yieldingly opposed by a coil spring 29 arranged between the upper end of the piston 28 and a cap 30 screwed onto the upper end of the cylinder 27.

It will be seen from the mechanism so far described that the position occupied by the piston 28 in the cylinder 27 will depend upon the position of the annular piston 19 in the annular well 18, and therefore upon the lead supported by the hook 13.

To indicate at any time the weight of the load supported by the hook, we employ a weight indicator 31 which is preferably attached to one of the downwardly extending side bars or straps 15 between the sheave supporting stud 12 and the hook supporting bar 16. This indicator 31 includes in addition to a casing 31$^a$, a suitably graduated scale or dial 31$^b$ and a needle or movable indicating device 31$^c$ which is secured to a centrally located spindle 31$^d$ extending rearwardly through the back of the instrument and through the supporting bar 15 and associated cheek plate 14. This indicator is adapted to be operated by a mechanical actuating means connected to the piston 28 and including a small pinion 32 which is secured to the inner end of the spindle 31$^d$ and is adapted to be actuated by a segment gear 33$^a$ carried by an arm of a bell crank 33 mounted for movement on a pin 34 supported in the side bar 15. This bell crank has a laterally projecting arm which is loosely connected to a link 35 which is pivotally connected to a piston rod 35$^a$ which extends downwardly through a central opening in the cap 30 of the cylinder 27 and is connected to the fluid actuated piston 28. The lower portions of the sheaves are preferably inclosed within a suitable apron or sheave casing 36 through which the link 35 freely extends.

It will be seen from the above described mechanism that the position of the indicating needle 31$^b$ of the indicator will depend upon the position of the piston 28, and any movement of the piston 28 will be transmitted by means of the mechanical actuating mechanism to the needle 31$^c$ so as to accurately indicate at any time the load which is supported on the hook.

We do not desire to be confined to the exact details or arrangements shown, but aim in our claims to cover all modifications which do not involve a departure from the spirit and scope of our invention.

Having described our invention, what we claim and desire to secure by Letters Patent is:

1. In a hoist block construction, a frame, said frame including side members and a lower cross member all of said members being relatively fixed; a load supporting member carried by the frame, means for indicating the weight of a load supported by said load supporting member, comprising a weight indicator carried by the frame in fixed position thereon, a fluid pressure operated device supported by the frame and controlled by the load on the load supporting member, and mechanical connecting means extending between said device and indicator and transmitting to the indicator movement imparted to said device.

2. In a hoist block construction, a frame including a pair of side members and a lower cross member all of said members being relatively fixed, a load supporting hook carried by the frame, means for indicating the weight of a load supported by said hook said means comprising a weight indicator carried by one of the side members of the frame, two cylinders, pistons working therein carried by the lower cross member, a passageway connecting said cylinders and adapted to contain a fluid, one of said pistons being connected to the load hook and the other being mechanically connected to the weight indicator.

3. In a hoist block construction, a shaft adapted to carry sheaves, a frame depending from said shaft, the members of said frame being rigid with respect to each other, a hook pivotally and swivelly supported by the frame, means for indicating the weight of a load supported by the hook comprising a weight indicator carried by the frame in fixed position thereon, a device controlled by the load on the hook and movable in accordance with changes of the same, said device being carried by a rigid part of the frame, and movement transmitting mechanism extending between said device and the indicator.

4. In a hoist block construction, a shaft adapted to carry sheaves, a frame depending from said shaft, the members of said frame being rigid with respect to each other, a hook pivotally and swivelly supported by the frame, means for indicating the weight of a load supported by the hook comprising a weight indicator supported by the frame independently of the hook, a fluid pressure operated device controlled by the load on the hook, said device being carried by a rigid part of the frame, and an actuating mechanism for the indicator connected to said device.

5. In a hoist block construction, a shaft adapted to carry sheaves, a frame depending from said shaft, the members of said frame being rigid with respect to each other, a hook pivotally and swivelly supported by the frame, means for indicating the weight of a load supported by the hook comprising a weight indicator supported by the frame independently of the hook, a fluid pressure operated device controlled by the load on the hook, an actuating mechanism for the indicator connected to said device and including a system of gearing and levers.

6. In a hoist block construction, a shaft adapted to carry sheaves, a frame depending from said shaft, the members of said frame being rigid with respect to each other, a hook pivotally and swivelly supported by the frame, means for indicating the weight of a load supported by the hook, comprising a weight indicator supported by the frame independently of the hook, a fluid pressure operated device supported by the frame and controlled by the load on the hook, and means connecting said device to the indicator so as to operate the same.

7. In a hoist block construction, a shaft adapted to carry sheaves, a frame depending from said shaft, the members of said frame being rigid with respect to each other, a hook pivotally and swivelly supported by the frame, means for indicating the weight of a load supported by the hook comprisng a fluid well in a portion of the frame, a piston in said well and connected to the hook, a second piston connected with the well so as to be shifted by fluid pressure, a weight indicator carried by the frame, and means connecting the said second piston with the indicator so as to actuate the same.

8. In hoisting apparatus, a frame including a lower part rigid with respect to the other parts of the frame, a load supporting member carried by said rigid lower part, a weight indicator supported in fixed position on the frame, two pressure transmitting devices carried by said rigid lower part, said part having a fluid filled passageway extending between said pressure transmitting devices, one of said devices being connected to the load supporting member, and movement transmitting mechanism connecting the other pressure transmitting device to the indicator.

In testimony whereof, we hereunto affix our signatures in the presence of witnesses.

CLEMENT E. BEARD.
WALTER G. STEPHAN.

Witnesses for Clement E. Beard:
  WILLIAM O. WALLACE,
  WILLIAM S. BAKER.

Witnesses for Walter G. Stephan:
  H. R. SULLIVAN,
  A. F. KWIS.